United States Patent Office 3,004,888
Patented Oct. 17, 1961

3,004,888
MASTITIS TREATMENT
Lloyd H. Conover, Quaker Hill, Conn., and Arthur R. English, Hohokus, N.J., assignors to Chas. Pfizer & Co., Inc., Brooklyn, N.Y., a corporation of Delaware
No Drawing. Filed Jan. 12, 1959, Ser. No. 786,051
4 Claims. (Cl. 167—53.2)

This application is concerned with a new chemotherapeutic agent, N-[1(5-nitro-2-furyl)-1-buten-3-ylidene]-3-aminooxazolid-2-one,

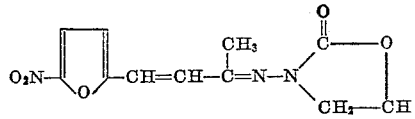

and with the use of this substance in the treatment of microbial infections, particularly in the treatment of mastitis.

Mastitis, an inflammation of the udder resulting from infection by microorganisms, commonly affects cattle, swine, sheep, and other domestic animals. Bovine mastitis is of particularly great economic consequence, causing an estimated 5% loss in total milk production at an annual cost of many millions of dollars.

In the acute form of this infection, milk secretion is curtailed or suspended, while in chronic mastitis it may continue but the composition of the milk is adversely affected and the bacterial count increased. If the disease is not checked, the cells which secrete the milk may be replaced by scar tissue, and in some cases the ensuing complications may even result in the death of the animal. The infection is readily spread from diseased to healthy animals by contamination of milkers' hands or milking machine cups.

The organisms most generally associated with mastitis are streptococci, including *S. agalactiae, S. pyogenes,* and *S. durans.* However, a number of other organisms are frequently responsible; these include, for example, *Staphylococcus aureus, Escherichia coli, Aerobacter aerogenes, Clostridium perfringens, Pasteurella multocida* and others.

Effective mastitis control requires early detection and treatment to minimize permanent effects and control the spread of the infection. Various therapeutic agents have been proposed for mastitis, including antibiotics, sulfonamides and other synthetic compounds, but no one drug has been found to be effective against all the organisms associated with this disease.

A novel chemical compound, N-[1(5-nitro-2-furyl)-1-buten-3-ylidene]-3-aminooxazolid-2-one, has now been discovered which exhibits surprising potency against a remarkably broad range of both gram-positive and gram-negative organisms and which is found to be particularly effective against those microorganisms known to cause mastitis.

The new compound is readily prepared by the condensation of 5-nitro-furfurylidene acetone with 3-amino-2-oxazolidone in the presence of an acid catalyst such as zinc chloride. A suitable medium for this reaction is an alcohol, such as ethanol, containing sufficient glacial acetic acid to solubilize the reactants. Heat will usually be applied to increase the rate of reaction, and the crystalline product may be isolated by evaporation of the solvent. The 3-aminooxazolidone required for the reaction is conveniently obtained by treating β-hydrazinoethanol with diethyl carbonate in the presence of sodium methylate.

The surprisingly broad antimicrobial spectrum and high potency of the new product of this invention is readily demonstrated in a brain-heart infusion which simulates body fluids by virtue of its amino acid and peptide content. The compound-in-broth is evaluated at a series of dilutions against the test organisms and the minimum concentration of N-[1(5-nitro-2-furyl)-1-buten-3-ylidene]-3-aminooxazolid-2-one necessary to inhibit organism growth for 24 hours at 37° C. determined. The compound inhibits growth of each of the following organisms at the indicated concentration:

| | Minimum inhibitory conc., mcg./ml. |
|---|---|
| *Streptococcus pyogenes* | 100 |
| *Micrococcus pyogenes* var. *aureus* | 25 |
| *Erysipelothrix rhusiopathiae* | 100 |
| *Corynebacterium diphtheriae* | 6.3 |
| *Listeria monocytogenes* | 100 |
| *Bacillus subtilis* | 6.3 |
| *Clostridium perfringens* | 0.78 |
| *Mycobacterium 607* | 100 |
| *Mycobacterium berolinense* | 50 |
| *Aerobacter aerogenes* | 50 |
| *Escherichia coli* | 200 |
| *Pasteurella multocida* | 25 |
| *Salmonella typhosa* | 200 |
| *Salmonella pullorum* | 12.5 |
| *Salmonella gallinarum* | 200 |
| *Klebsiella pneumoniae* | 50 |
| *Hemophilus influenzae* | 100 |
| *Shigella sonnei* | 50 |
| *Erwinia amylovora* | 200 |
| *Phytomonas tumefaciens* | 200 |
| *Desulfovibrio desulfuricans* | 200 |
| *Vibrio comma* | 200 |
| *Candida albicans* | 200 |

The surprising activity of the new compound against various forms of mastitis is further illustrated by adding it in whole, commercial milk to a sterile disc on an agar plate seeded with one of the following mastitis-associated organisms:

*Staphylococcus aureus*
*Escherichia coli*
*Streptococcus agalactiae*

When 100 mcg. of the product of this invention is applied to each disc and such plates are incubated at 37° C. for 24 hours, large zones of growth inhibition are observed.

While it may sometimes be desirable to administer our new compound to the infected animal intravenously or intramuscularly, it is usually preferable to infuse it into the infected quarter through the teat canal. The period of treatment will naturally vary with the causative organism or organisms and the virulence of the infection, but administration at least once daily for several days will often be effective.

For convenient application the new drug will usually be formulated in a diluent, either liquid, semi-viscous, or solid, of the class acceptable in veterinary practice. A wide variety of extending agents are suitable, and these include petrolatum bases such as those sold commercially under the name petroleum jelly with a melting range of from about 38° C. to about 60° C., as well as the lower melting forms commercially available as mineral oils. Other useful excipients include polyhydroxy ethers such as those formed by condensing ethylene or propylene glycols with themselves or with ethylene or propylene oxide. Vegetable oil gels prepared by warming a vegetable oil such as sesame, cotton-seed, peanut or corn oil with magnesium or aluminum stearate can also be employed. Various sugars or sugar alcohols such as lactose, glucose, mannitol or sorbitol can also be used. Carboxymethyl cellulose or polyvinylpyrrolidone are also useful. Aqueous solutions, emulsions or suspensions which may or may not contain excipients of the type disclosed above are also useful.

Where our new substance is employed as the sole antimicrobial agent in mastitis treatment it will usually be incorporated in the vehicle at a concentration of from about 0.2 to about 5%. However, it may often be desirable to employ it in conjunction with other therapeutic agents active against mastitis, such as antibiotics, in which case even lower concentrations of N-[1(5-nitro-2-furyl) - 1 - buten - 3 - ylidene] - 3 - aminooxazolid - 2-one may prove beneficial. Normally, a concentration of at least 0.1% of the new compound will be employed.

One convenient method of administering the formulation to the diseased animal is from a collapsible container having a cannula for insertion into teat canal. For example, a collapsible tube containing the therapeutic composition in the form of an ointment may be employed. Alternatively, a milk-dispersible concentrate may be administered from a resilient container, such as a polyethylene bottle. In this case the container is squeezed to expel most of the air, and the cannula inserted into the teat canal. By releasing the pressure exerted on the container, while milking the animal with the other hand, milk is withdrawn into the container and mixed with the therapeutic composition. The milk is then preferably passed back and forth between the container and the infected quarter until all of the medicament has been dispersed in the milk. The mixture is then completely expelled into the infected quarter and the cannula withdrawn.

In addition to its use in the treatment of mastitis, N-[1(5 - nitro - 2 - furyl) - 1 -buten - 3 - ylidene] - 3-aminooxazolid-2-one, by virtue of its broad antimicrobial spectrum, has other applications as well. For example, it may be employed as a bacteriostatic agent on burns and surface wounds, and is useful in the treatment of infections due to sensitive organisms. For these applications, it may be administered in an ointment, or in solution, suspension or emulsion in a non-toxic, acceptable vehicle. The new substance of this invention is also useful in separating and classifying organisms for medical and diagnostic purposes, and in industrial fermentations, to prevent contamination by sensitive microorganisms.

The low toxicity of N-[1(5-nitro-2-furyl)-1-buten-3-ylidene]-3-aminooxazolid-2-one is illustrated by the fact that when it is administered orally to rats at a level of 100 mg. per kilogram of body weight no ill effects are observed.

The following examples are given by way of illustration and should not be interpreted as restricting the present invention, the scope of which is indicated by the appended claims.

EXAMPLE I

Nine grams 5-nitrofurfurylidene acetone are dissolved in 400 cc. ethanol plus 20 cc. glacial acetic acid containing 0.2 g. fused zinc chloride. Six grams 3-amino-2-oxazolidone are dispersed in 200 cc. ethanol plus 10 cc. glacial acetic acid and added to the ketone solution. The resulting mixture is warmed on a steam bath for two hours and stirred overnight at room temperature. Two-thirds of the solvent is removed by distillation at reduced pressure and the residual solution is cooled in ice. The resulting slurry is filtered and 12.6 g. N-[1(5-nitro - 2 - furyl) - 1 - buten - 3 - ylidene] - 3 - aminooxazolid-2-one are obtained. The product, melting at 155–161° C., is further purified by recrystallization from ethanol, which raises the melting point to 164–166.5°. The elemental analysis is: Calculated for $C_{11}H_{11}O_5N_3$: carbon 49.81%; hydrogen 4.18%; nitrogen 15.8%. Found: carbon 49.63%; hydrogen 4.30%; nitrogen 15.4%.

EXAMPLE II

N - [1(5 - nitro - 2 - furyl) - 1 - buten - 3 - ylidene]-3-aminooxazolid-2-one, prepared as described in Example I, is tested for antimicrobial activity in a brain-heart medium (purchased from Difco Laboratories of Detroit, Michigan) having the following composition:

|  | G. |
|---|---|
| Calf brains, infusion from | 200 |
| Beef heart, infusion from | 250 |
| Proteose peptone | 10 |
| Dextrose | 2 |
| Sodium chloride | 5 |
| Disodium phosphate | 2.5 |

37 grams of the dehydrated medium are dissolved in a liter of distilled water and the medium is sterilized in an autoclave.

The aminooxazolidone is added to the brain-heart broth to a final stock concentration of 1000 mcg. per ml. The compound-in-broth is then incubated at 37° C. for periods of 2 and 24 hours, and 0.1 ml. samples are pipetted to sterile discs on seeded agar plates containing Staphylococcus aureus, Escherichia coli and Streptococcus agalactiae, respectively. The plates are held at 37° C. for 18–24 hours and the diameters of the resulting zones of inhibition are measured. The results are as follows:

Zone size, millimeters

| Organism | Incubation period | |
|---|---|---|
|  | 2 hrs. | 24 hrs. |
| Staphylococcus aureus | 30 | 25 |
| Escherichia coli | 25 | 23 |
| Streptococcus agalactiae | 20 | 19 |

EXAMPLE III

The procedure of Example II is repeated, substituting whole, commercial milk for the brain-heart medium. The diameters of the zones of inhibition are as follows:

Zone size, millimeters

| Organism | Incubation period | |
|---|---|---|
|  | 2 hrs. | 24 hrs. |
| Staphylococcus aureus | 31 | 25 |
| Escherichia coli | 22 | 23 |
| Streptococcus agalactiae | 21 | 20 |

EXAMPLE IV

An ointment of the following composition is prepared:

| N-[1(5-nitro-2-furyl)-1-buten-3-ylidene]-3-aminooxazolid-2-one | mg | 500 |
|---|---|---|
| Aluminum tristearate | g | 0.3 |
| Mineral oil, U.S.P. | g | 15 |

Ten cc. portions of the formulation are infused from a collapsible tube daily into the infected quarters of a cow suffering from mastitis. After three days' treatment the infection is cured.

EXAMPLE V

The following composition is prepared:

| N-[1(5-nitro-2-furyl)-1-buten-3-ylidene]-3-aminooxazolid-2-one | g | 1 |
|---|---|---|
| Polyethylene glycol (mol. wt. about 4000) | g | 5 |
| Stearyl alcohol | g | 8 |
| Glycerine | g | 7 |
| Water | cc | 20 |
| Sodium lauryl sulfate | mg | 200 |

This formulation is successfully employed in the treatment of bovine mastitis by infusion of 10 cc. portions into the infected quarters from a resilient container.

The following compositions are prepared and successfully employed in the treatment of mastitis and other infections due to sensitive organisms:

EXAMPLE VI

| | | |
|---|---|---|
| N-[1(5-nitro-2-furyl)-1-buten-3-ylidene]-3-aminooxazolid-2-one | mg | 500 |
| Sulfathiazole | mg | 200 |
| Aluminum tristearate | g | 0.3 |
| Peanut oil | cc | 20 |

EXAMPLE VII

| | | |
|---|---|---|
| N-[1(5-nitro-2-furyl)-1-buten-3-ylidene]-3-aminooxazolid-2-one | mg | 20 |
| Sulfadiazine | mg | 300 |
| Aluminum monostearate | g | 0.5 |
| Sesame oil | cc | 20 |

EXAMPLE VIII

| | | |
|---|---|---|
| N-[1(5-nitro-2-furyl)-1-buten-3-ylidene]-3-aminooxazolid-2-one | mg | 40 |
| Cottonseed oil, U.S.P | cc | 20 |

EXAMPLE IX

| | | |
|---|---|---|
| N-[1(5-nitro-2-furyl)-1-buten-3-ylidene]-3-aminooxazolid-2-one | mg | 100 |
| Neomycin sulfate | mg | 50 |
| Tetracycline | mg | 100 |
| Polyethylene glycol (mol. wt. about 400) | cc | 20 |

EXAMPLE X

| | | |
|---|---|---|
| N-[1(5-nitro-2-furyl)-1-buten-3-ylidene]-3-aminooxazolid-2-one | mg | 200 |
| Oxytetracycline hydrochloride | mg | 250 |
| Mineral oil, U.S.P | cc | 20 |

EXAMPLE XI

| | | |
|---|---|---|
| N-[1(5-nitro-2-furyl)-1-buten-3-ylidene]-3-aminooxazolid-2-one | mg | 400 |
| Lactose, U.S.P | g | 10 |

What is claimed is:
1. N - [1(5 - nitro -2- furyl) -1- buten -3- ylidene]-3-aminooxazolid-2-one represented by the formula:

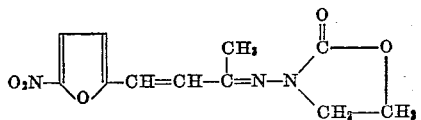

2. An antimicrobial composition comprising at least 0.1% by weight of N-[1(5-nitro-2-furyl)-1-buten-3-ylidene]-3-aminooxazolid-2-one in a pharmaceutically acceptable vehicle.

3. A method of treating bovine mastitis which comprises infusing into the udder of the infected host a composition containing a therapeutically effective concentration of N-[1(5-nitro-2-furyl) -1- buten -3- ylidene]-3-aminooxazolid-2-one in a pharmaceutically acceptable vehicle.

4. A method of treating bovine mastitis which comprises infusing into the udder of the infected host a composition containing at least 0.1% by weight of N-[1(5-nitro -2- furyl) -1- buten -3- ylidene] -3- aminooxazolid-2-one in a pharmaceutically acceptable vehicle.

References Cited in the file of this patent

UNITED STATES PATENTS

| | | |
|---|---|---|
| 2,726,241 | Gever | Dec. 6, 1955 |
| 2,759,932 | Ebetino | Aug. 21, 1956 |
| 2,847,416 | Gever | Aug. 12, 1958 |

OTHER REFERENCES

Hayes: J.A.C.S., vol. 77, April-June 1955, pp. 2282, 2283.

U.S. Dispensatory, 25th ed., 1955, p. 1997, Lippincott Co., Philadelphia, Pennsylvania.